(12) United States Patent
Yang

(10) Patent No.: US 11,477,669 B2
(45) Date of Patent: Oct. 18, 2022

(54) METHOD OF TRANSMITTING BEAM FAILURE RECOVERY REQUEST AND USER EQUIPMENT

(71) Applicant: VIVO MOBILE COMMUNICATION CO., LTD., Chang'an Dongguan (CN)

(72) Inventor: Yu Yang, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 67 days.

(21) Appl. No.: 16/968,982

(22) PCT Filed: Jan. 14, 2019

(86) PCT No.: PCT/CN2019/071611
§ 371 (c)(1),
(2) Date: Aug. 11, 2020

(87) PCT Pub. No.: WO2019/154023
PCT Pub. Date: Aug. 15, 2019

(65) Prior Publication Data
US 2021/0058804 A1 Feb. 25, 2021

(30) Foreign Application Priority Data
Feb. 11, 2018 (CN) .......................... 201810142659.9

(51) Int. Cl.
*H04W 24/04* (2009.01)
*H04W 28/02* (2009.01)
(Continued)

(52) U.S. Cl.
CPC .......... *H04W 24/04* (2013.01); *H04B 7/0695* (2013.01); *H04B 7/0888* (2013.01);
(Continued)

(58) Field of Classification Search
None
See application file for complete search history.

(56) References Cited

U.S. PATENT DOCUMENTS

2017/0196024 A1* 7/2017 Uchino ............... H04W 56/002
2018/0219604 A1 8/2018 Lu et al.
(Continued)

FOREIGN PATENT DOCUMENTS

CN 107079459 A 8/2017
WO 2017180 A1 10/2017
(Continued)

OTHER PUBLICATIONS

International Search Report & Written Opinion related to Application No. PCT/CN2019/071611; dated Aug. 11, 2020.
(Continued)

*Primary Examiner* — Faruk Hamza
*Assistant Examiner* — Cassandra L Decker
(74) *Attorney, Agent, or Firm* — von Briesen & Roper, s.c.

(57) ABSTRACT

A method of transmitting a beam failure recovery request and UE are provided. The method is applied to UE and includes: transmitting, in a case that it is determined that a first time period for transmitting a beam failure recovery request and at least one second time period for transmitting an uplink channel or signal overlap and the uplink channel or signal supposed to be transmitted within the at least one second time period does not carry the beam failure recovery request, the beam failure recovery request to a network side device within the first time period.

16 Claims, 4 Drawing Sheets

(51) Int. Cl.
  *H04W 72/04* (2009.01)
  *H04W 76/15* (2018.01)
  *H04B 7/08* (2006.01)
  *H04B 7/06* (2006.01)
  *H04W 28/04* (2009.01)
  *H04W 24/02* (2009.01)

(52) U.S. Cl.
  CPC ....... *H04W 24/02* (2013.01); *H04W 28/0289* (2013.01); *H04W 28/04* (2013.01); *H04W 72/0446* (2013.01); *H04W 76/15* (2018.02)

(56) References Cited

U.S. PATENT DOCUMENTS

| | | | | |
|---|---|---|---|---|
| 2018/0367374 | A1* | 12/2018 | Liu | H04L 5/0023 |
| 2021/0068162 | A1* | 3/2021 | Agiwal | H04L 41/0668 |
| 2021/0083747 | A1* | 3/2021 | Zhou | H04W 76/19 |
| 2021/0204346 | A1* | 7/2021 | Ye | H04B 7/00 |

FOREIGN PATENT DOCUMENTS

| | | |
|---|---|---|
| WO | 103259635 A1 | 10/2017 |
| WO | 2017180336 A1 | 10/2017 |

OTHER PUBLICATIONS

Chinese Office Action for related Chinese Application No. 201810142659.9; dated May 6, 2020.

Vivo, "Remaining issues on mechanism to recover from beam failure", Feb. 26-Mar. 2, 2018, 3GPP TSG RAN WG1 Meeting #92, Athens, Greece.

Lenovo, Motorola Mobility, "Prioritized random access for beam failure recovery", Jan. 22-26, 2018, 3GPP TSG-RAN WG2 Meeting NR AH 1801, Vancouver, Canada.

NTT Docomo, Inc., "Discussion on Beam failure recovery", Jan. 22-26, 2018. 3GPP TSG-RAN WG2 NR Ad hoc 1801, Vancouver, Canada.

* cited by examiner

METHOD OF TRANSMITTING BEAM FAILURE RECOVERY REQUEST AND USER EQUIPMENT

CROSS-REFERENCE TO RELATED APPLICATION

This patent application is a 35 USC § 371 U.S. national stage of International Application No. PCT/CN2019/071611 filed on Jan. 14, 2019, which claims a priority to Chinese Patent Application No. 201810142659.9, filed with the China National Intellectual Property Administration on Feb. 11, 2018, and entitled "METHOD OF TRANSMITTING BEAM FAILURE RECOVERY REQUEST AND USER EQUIPMENT", a disclosure of which is incorporated in its entirety by reference herein.

TECHNICAL FIELD

The present application relates to the field of telecommunication technology, in particular to a method of transmitting a beam failure recovery request and user equipment (UE).

BACKGROUND

In a high-frequency band communication system, radio signals have a relatively short wavelength, and as a result, communication is susceptible to interruption due to the blockage of signals, the movement of UE or the like. When communication is interrupted, the system needs to recover communication through beam failure recovery.

Generally, in a common process of beam failure recovery, UE acquires a hypothetical physical downlink control channel (PDCCH) block error rate (BLER) by monitoring a downlink beam for a beam failure detection reference signal in a physical layer, determines that the downlink beam fails if the acquired hypothetical PDCCH BLER exceeds a preset threshold, and determines that a beam failure event occurs if the UE detects that all hypothetical PDCCH beams fail. When the UE determines that the beam failure event occurs and a trigger condition for a beam failure recovery request is satisfied, the UE transmits a beam failure recovery request to a network side device on a contention-free physical random access channel (PRACH). A base station transmits a response signaling to the UE after receiving the beam failure recovery request transmitted by the UE. After receiving the response signaling transmitted by the base station, the UE performs beam failure recovery according to the response signaling transmitted by the base station. However, if the UE further needs to transmit other uplink channel or signal while transmitting a beam failure recovery request by using a PRACH resource, due to limitations with respect to factors such as uplink transmit power and antenna structure of the UE, the beam failure recovery request based on the PRACH resource and the other uplink channel or signal cannot be transmitted simultaneously, resulting in that the beam failure recovery request cannot be transmitted properly.

SUMMARY

Embodiments of the present application provide a method of transmitting a beam failure recovery request and UE, to resolve the problem in the related art that a beam failure recovery request cannot be transmitted properly when the beam failure recovery request and other uplink channel or signal need to be transmitted simultaneously.

To resolve the foregoing technical problem, the present application is implemented as follows:

In a first aspect, the present application provides in some embodiments a method of transmitting a beam failure recovery request, applied to UE, including:

transmitting, in a case that it is determined that a first time period for transmitting a beam failure recovery request and at least one second time period for transmitting an uplink channel or signal overlap and the uplink channel or signal supposed to be transmitted within the at least one second time period does not carry any beam failure recovery request, the beam failure recovery request to a network side device within the first time period.

In a second aspect, the present application provides in some embodiments UE, including a processing unit and a transmission unit, where the processing unit is configured to: in a case that it is determined that a first time period for transmitting a beam failure recovery request and at least one second time period for transmitting an uplink channel or signal overlap and the uplink channel or signal supposed to be transmitted within the at least one second time period does not carry any beam failure recovery request, control the transmission unit to transmit the beam failure recovery request to a network side device within the first time period.

In a third aspect, the present application provides in some embodiments UE, including: a processor, a storage, and a computer program stored in the storage and configured to be executed by the processor, where the processor is configured to execute the computer program to implement the steps in the method of transmitting a beam failure recovery request according to the first aspect.

In a fourth aspect, the present application provides in some embodiments a computer-readable storage medium, storing therein a computer program, where the computer program is configured to be executed by a processor to implement the steps in the method of transmitting a beam failure recovery request according to the first aspect.

In the embodiments of the present application, in a case that it is determined that a first time period for transmitting a beam failure recovery request by UE and at least one second time period for transmitting an uplink channel or signal by the UE overlap and the uplink channel or signal supposed to be transmitted within the at least one second time period does not carry any beam failure recovery request, the UE transmits the beam failure recovery request to a network side device within the first time period. That is, in the embodiments of the present application, a priority level of transmitting a beam failure recovery request is higher than a priority level of transmitting other uplink channel or signal. Therefore, in the embodiments of the present application, the normal transmission of a beam failure recovery request can be ensured when a time period for transmitting a beam failure recovery request conflicts with a time period for transmitting other uplink channel or signal, so that communication efficiency can be improved.

DETAILED DESCRIPTION

Figure 1:
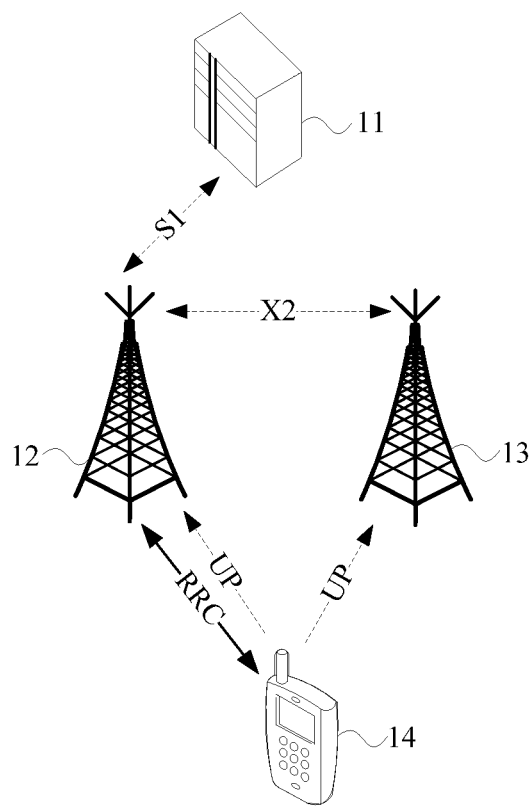
FIG. 1 is a schematic diagram of a possible structure of a communication system related to embodiments of the present application.

The following clearly and completely describes the technical solutions in the embodiments of the present application with reference to the accompanying drawings in the embodiments of the present application. Apparently, the described embodiments are only some embodiments of the present application rather than all the embodiments. All other embodiments obtained by persons of ordinary skill in the art based on the embodiments of the present application without creative efforts shall fall within the scope of the present application.

The term "and/or" in this specification describes only an association relationship for describing associated objects and represents that three relationships may exist. For example, A and/or B may represent the following three cases: only A exists, both A and B exist, and only B exists. In addition, the character "/" herein generally represents an "or" relationship between the associated objects. In a formula, the character "/" represents a "division" relationship between the associated objects. "A plurality of" used herein means "two or more", if not otherwise specified.

For the clear description of the technical solutions in the embodiments of the present application, in the embodiments of the present application, the terms "first", "second", and the like are used to distinguish between the same items or similar items with basically the same function or effect. A person skilled in the art may understand that the terms "first", "second", and the like are not used to limit the quantities and execution orders.

In the embodiments of the present application, the term "for example" and the like are used to represent examples, illustrations or descriptions. Any embodiment or design scheme described as "for example" in the embodiments of the present application should not be construed to be more preferred than or superior over other embodiments or design schemes. Precisely, the terms such as "for example" are used to present related concepts in specific manners. In the embodiments of the present application, "a plurality of" used herein means "two or more", unless otherwise described.

If UE further needs to transmit other uplink channel or signal while transmitting a beam failure recovery request by using a PRACH resource, due to limitations with respect to factors such as uplink transmit power and antenna structure of the UE, the beam failure recovery request based on the PRACH resource and other uplink channel or signal cannot be transmitted simultaneously, resulting in that the beam failure recovery request cannot be transmitted properly.

To resolve this problem, the present application provides in some embodiments a method of transmitting a beam failure recovery request and UE. In the method, in a case that it is determined that a first time period for transmitting a beam failure recovery request by UE and at least one second time period for transmitting an uplink channel or signal by the UE overlap and the uplink channel or signal supposed to be transmitted within the at least one second time period does not carry the beam failure recovery request, the UE transmits the beam failure recovery request to a network side device within the first time period. That is, in the embodiments of the present application, a priority level of transmitting a beam failure recovery request is higher than a priority level of transmitting other uplink channel or signal. Therefore, in the embodiments of the present application, the normal transmission of a beam failure recovery request can be ensured when a time period for transmitting a beam failure recovery request conflicts with a time period for transmitting other uplink channel or signal.

The technical solutions provided in the present application may be applied to various communication systems such as a fifth-generation (5G) communication system, a future evolved system or various communication convergence systems. There may be various application scenarios, for example, machine to machine (M2M), device-to-machine (D2M), macro and micro communication, enhanced mobile broadband (eMBB), ultra-reliable and low-latency communications (uRLLC), massive machine type communication (mMTC) and the like. These scenarios include, but are not limited to, communication between UEs, communication between network side devices, communication between a network side device and UE, or the like. The embodiments of the present application may be applied to communication between a network side device and UE, communication between UEs or communication between network side devices in a 5G communication system.

FIG. 1 is a schematic diagram of a possible structure of a communication system related to embodiments of the present application. As shown in FIG. 1, the communication system may include a mobility management entity (MME) 11, a first network side device 12, a second network side device 13, and UE 14. Carrier aggregation is configured in the first network side device 12 and the second network side device 13 respectively. The first network side device 12 and the second network side device 13 are connected by an X2 interface, and the first network side device 12 and the MME 11 are connected by an S1 interface. In addition, to reduce the complexity of the UE 14, the UE 14 is prevented from simultaneously establishing a plurality of radio resource control (RRC) links. In the communication system to which the embodiments of the present application are applied, the UE 14 includes only one RRC link, and an opposite end of the RRC link is the first network side device 12. Therefore, the second network side device 13 cannot directly transmit control signaling to the UE 14. Instead, to implement an interaction process in a logic signaling layer, forwarding through the first network side device 12 is required. Similarly, to avoid an impact on the MME 11, no signaling interaction link is established between the second network side device 13 and the MME 11. Rather, the second network side device 13 performs signaling interaction with the MME 11 by forwarding through the first network side device 12.

In the communication system shown in FIG. 1, for ease of distinguishing, in the embodiments of the present application, all serving carriers configured on the first network side device 12 are referred to as a master cell group (MCG), and all serving carriers configured on the second network side device 13 are referred to as an a secondary cell group (SCG). The MCG includes at least one primary cell (PCell) and optionally includes one or more secondary cells (SCells). That is, if the MCG has only one cell, the cell is considered as the PCell of the MCG. The SCG includes at least one primary secondary cell (PSCell) and optionally includes one or more SCells. That is, if the SCG has only one cell, the cell may be considered as the PSCell of the SCG.

Further, the first network side device 12 and/or the second network side device 13 may be a base station, a core network device, a transmission and reception point (TRP), a relay station, an access point or the like. The first network side device 12 and/or the second network side device 13 may be a base transceiver station (BTS) in a global system for mobile communications (GSM) or code division multiple access (CDMA) network, or may be a NodeB (NB) in wideband code division multiple access (WCDMA), or may be an evolutional NodeB (eNB or eNodeB) in Long-Term Evolution (LTE). The first network side device 12 and/or the second network side device 13 may be a radio controller in a cloud radio access network (CRAN) scenario as well. The network side device may be a network side device in a 5G communication system or a network side device in a future evolved network as well. However, the terms used do not constitute a limitation on the present application.

The UE 14 may be wireless UE or may be wired UE. The wireless UE may refer to a device that provides a user with voice and/or other service data connectivity, a handheld device having a wireless communication function, a computing device or another processing device connected to a wireless modem, an in-vehicle device, a wearable device, UE in a future 5G network, UE in a future evolved public land mobile network (PLMN) network or the like. The wireless UE may communicate with one or more core networks through a radio access network (RAN). The wireless UE may be a mobile terminal, for example, a mobile phone (or referred to as a "cellular" phone) or a computer equipped with a mobile terminal, and may be a portable, pocket-sized, handheld, computer built-in or in-vehicle mobile apparatus, which exchanges voice and/or data with the RAN. For example, the wireless terminal may be a device such as a personal communication service (PCS) phone, a cordless phone, a session initiation protocol (SIP) phone, a wireless local loop (WLL) station or a personal digital assistant (PDA). The wireless terminal may also be a mobile device, a UE terminal, an access terminal, a wireless communication device, a terminal unit, a terminal station, a mobile station, a mobile, a remote station, a remote terminal, a subscriber unit, a subscriber station, a user agent, a terminal apparatus or the like. For example, in the embodiments of the present application, FIG. 1 illustrates exemplarily a terminal as a mobile phone.

It further needs to be noted that, FIG. 1 shows exemplarily that the communication system, to which the method of transmitting a beam failure recovery request provided in the embodiments of the present application is applied, includes one second network side device 13. However, the embodiments of the present application are not limited thereto. The communication system, to which the method of transmitting a beam failure recovery request provided in the embodiments of the present application is applied, may also include a plurality of second network side devices 13. A quantity of the second network side devices 13 included in the communication system, to which the method of transmitting a beam failure recovery request is applied, is not limited in the embodiments of the present application.

Figure 2:
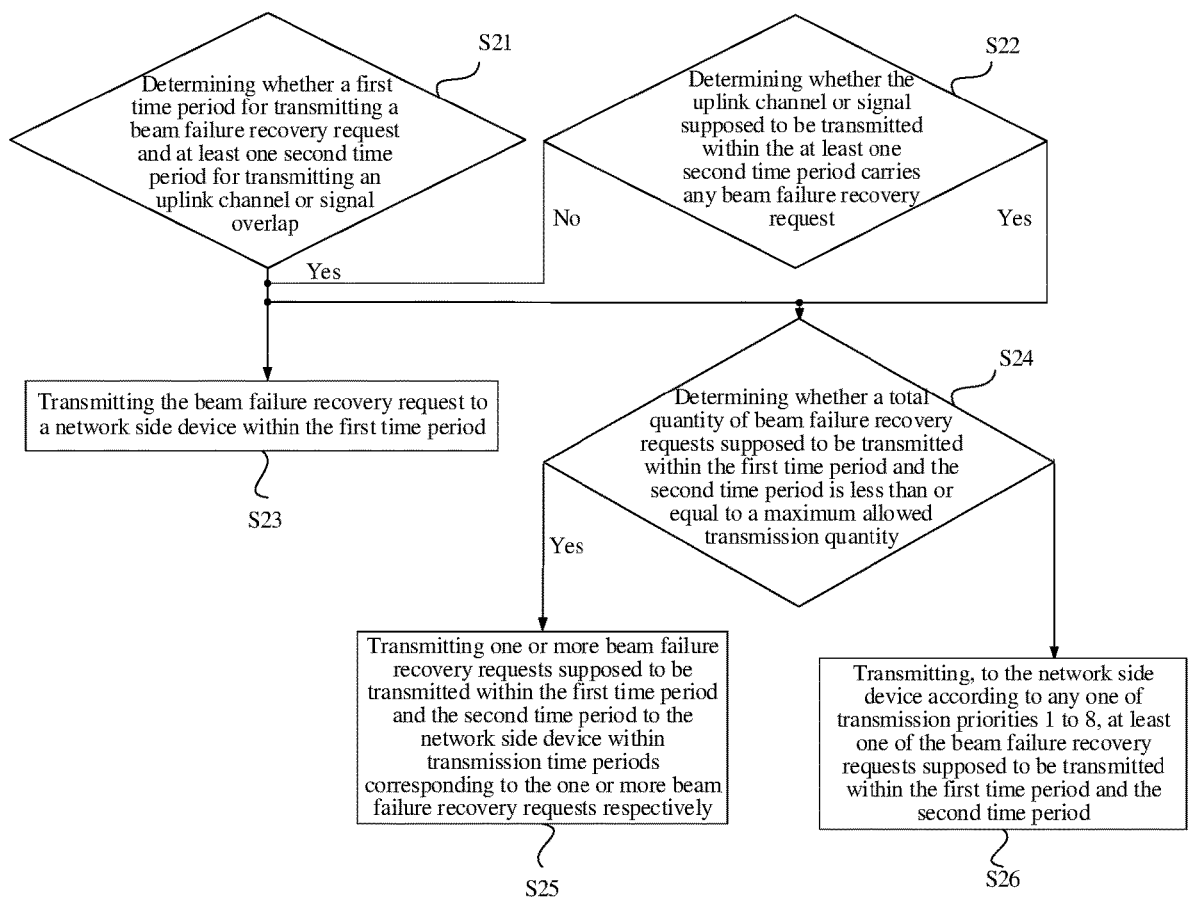
FIG. 2 is a schematic flowchart of a method of transmitting a beam failure recovery request according to an embodiment of the present application.

The present application provides in some embodiments a method of transmitting a beam failure recovery request. The method is applied to a terminal device side, for example, UE. FIG. 2 is a schematic flowchart of a method of transmitting a beam failure recovery request according to an embodiment of the present application. As shown in FIG. 2, the method of transmitting a beam failure recovery request may include the following steps.

A step S21 includes: determining whether a first time period for transmitting a beam failure recovery request by UE and at least one second time period for transmitting an uplink channel or signal by the UE overlap.

Figure 3:
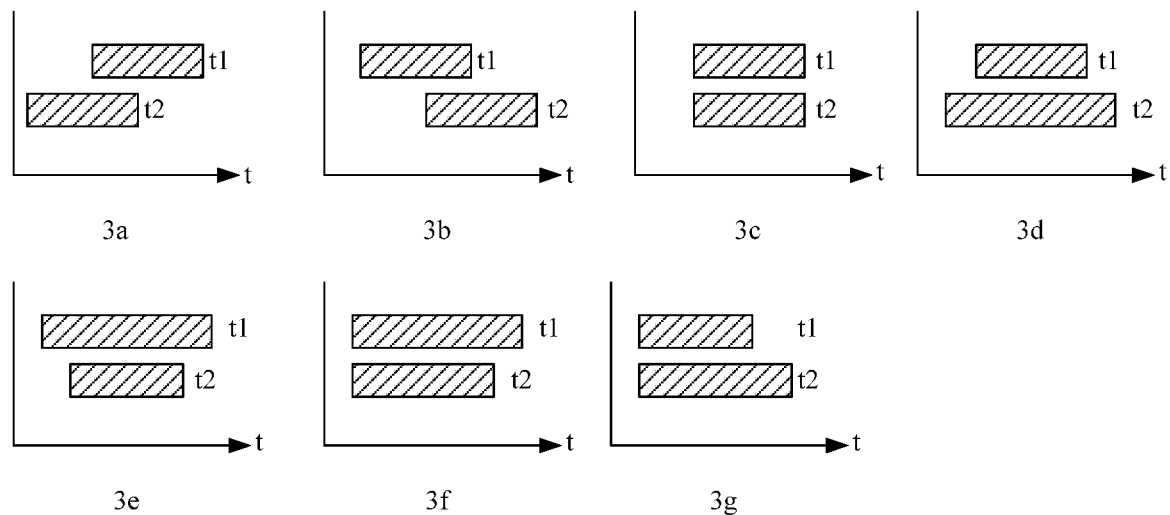
FIG. 3 is a schematic diagram of the overlap between a first time period and a second time period according to an embodiment of the present application.

Specifically, that the first time period for transmitting the beam failure recovery request and one second time period for transmitting the uplink channel or signal overlap may include a plurality of possible cases as shown in 3a to 3g of FIG. 3. As shown in 3a of FIG. 3, a start moment of a second time period t2 is before a start moment of a first time period t1, and an end moment of the second time period t2 is after the start moment of the first time period t1. In this case, the first time period t1 and the second time period t2 overlap, and an overlap length is the length from the start moment of the first time period t1 to the end moment of the second time period t2. As shown in 3b of FIG. 3, the start moment of the first time period t1 is before the start moment of the second time period t2, and an end moment of the first time period t1 is after the start moment of the second time period t2. In this case, the first time period t1 and the second time period overlap. An overlap length is the length from the start moment of the second time period t2 to the end moment of the first time period t1. As shown in 3c of FIG. 3, the start moment and the end moment of the first time period t1 are the same as those of the second time period t2. In this case, the first time period t1 and the second time period overlap. An overlap length is the length of the first time period t1 or the second time period t2. As shown in 3d of FIG. 3, the start moment of the second time period t2 is before the start moment of the first time period t1, and the end moment of the second time period t2 is after the end moment of the first time period t1. In this case, the first time period t1 and the second time period overlap. An overlap length is the length of the first time period t1. As shown in 3e of FIG. 3, the start moment of the first time period t1 is before the start moment of the second time period t2, and the end moment of the first time period t1 is after the end moment of the second time period t2. In this case, the first time period t1 and the second time period t2 overlap. An overlap length is the length of the second time period t2. As shown in 3f of FIG. 3, the start moment of the first time period t1 is the same as the start moment of the second time period t2, and the end moment of the first time period t1 is after the end moment of the second time period t2. In this case, the first time period t1 and the second time period t2 overlap. An overlap length is the length of the second time period t2. As shown in 3g of FIG. 3, the start moment of the first time period t1 is the same as the start moment of the second time period t2, and the end moment of the second time period t2 is after the end moment of the first time period t1. In this case, the first time period t1 and the second time period t2 overlap. An overlap length is the length of the first time period t1.

In the step S21, if it is determined that the first time period for transmitting the beam failure recovery request by UE and any second time period for transmitting the uplink channel or signal by the UE do not overlap, that is, no other uplink channel or signal needs to be transmitted within the first time period for transmitting the beam failure recovery request, the transmission of a beam failure recovery request and an uplink channel or signal is not limited by conditions such as an uplink transmit power of the UE, an antenna structure of the UE, protocol specifications, and network configurations. Therefore, the UE may directly transmit a first beam failure recovery request within the first time period.

A step S22 includes: determining whether the uplink channel or signal supposed to be transmitted within the at least one second time period carries any beam failure recovery request.

It needs to be noted that the time order of the steps S21 and S22 is not limited in the embodiments of the present application. That is, first, it may be determined whether the first time period for transmitting the beam failure recovery request and the second time period for transmitting at least one uplink channel or signal overlap, and then it is determined whether the uplink channel or signal supposed to be transmitted within the at least one second time period includes any beam failure recovery request. Alternatively, first, it may be determined whether the uplink channel or signal supposed to be transmitted within the at least one second time period includes any beam failure recovery request, and then it is determined whether the first time period for transmitting the beam failure recovery request and the second time period for transmitting the at least one uplink channel or signal overlap. Alternatively, the steps S21 and S22 may be simultaneously performed.

For example, the uplink channel or signal supposed to be transmitted within the at least one second time period may include uplink control information (UCI) transmitted by using a physical uplink control channel (PUCCH) resource, where the PUCCH may be a periodic PUCCH, a semi-persistent PUCCH or an aperiodic PUCCH.

For example, the uplink channel or signal supposed to be transmitted within the at least one second time period may include a sounding reference signal (SRS). Specifically, the SRS may be specifically a periodic SRS, a semi-persistent SRS or an aperiodic SRS.

For example, the uplink channel or signal supposed to be transmitted within the at least one second time period may include a PRACH for initial access.

For example, the uplink channel or signal supposed to be transmitted within the at least one second time period may include a beam failure recovery request.

Further, the uplink channel or signal in the foregoing embodiments may be other uplink channel or signal as well. This is not limited in the embodiments of the present application. Any uplink channel or signal may be applicable.

In the foregoing steps S21 and S22, the first time period for transmitting the beam failure recovery request by the UE and the at least one second time period for transmitting the uplink channel or signal by the UE overlap, and the uplink channel or signal supposed to be transmitted within the at least one second time period does not carry any beam failure recovery request. In this case, a step S23 is performed.

The step S23 includes: transmitting, by the UE, the beam failure recovery request to a network side device within the first time period.

Specifically, it may be configured that a priority level of transmitting the beam failure recovery request is higher than that of transmitting any other uplink channel or signal, so that when the first time period for transmitting the beam failure recovery request and the second time period for transmitting the uplink channel or signal overlap and the uplink channel or signal supposed to be transmitted within the at least one second time period does not carry any beam failure recovery request, the beam failure recovery request is preferentially transmitted.

Further, the case in the foregoing embodiments that the first time period for transmitting the beam failure recovery request and the at least one second time period for transmitting the uplink channel or signal overlap and the uplink channel or signal supposed to be transmitted within the at least one second time period does not carry any beam failure recovery request may be found in the following application scenarios.

1. The beam failure recovery request supposed to be transmitted within the first time period and the uplink channel or signal supposed to be transmitted within the at least one second time period are for the same cell.

Specifically, that the beam failure recovery request supposed to be transmitted within the first time period and the uplink channel or signal supposed to be transmitted within the at least one second time period are for the same cell includes the following cases:

1.1. Both the beam failure recovery request and the uplink channel or signal are for a PCell in an MCG.

1.2. Both the beam failure recovery request and the uplink channel or signal are for an SCell in an MCG.

1.3. Both the beam failure recovery request and the uplink channel or signal are for a PSCell in an SCG.

1.4. Both the beam failure recovery request and the uplink channel or signal are for an SCell in an SCG.

2. The beam failure recovery request supposed to be transmitted within the first time period and the uplink channel or signal supposed to be transmitted within the at least one second time period are for different cells in the same cell group.

Specifically, that the beam failure recovery request supposed to be transmitted within the first time period and the uplink channel or signal supposed to be transmitted within the at least one second time period are transmitted in different cells in the same cell group includes the following cases:

2.1. The beam failure recovery request and the uplink channel or signal are for different cells in the same MCG.

2.1.1. Both the beam failure recovery request and the uplink channel or signal are for the same MCG, the beam failure recovery request is for a PCell in the MCG, and the uplink channel or signal is for an SCell in the MCG.

2.1.2. Both the beam failure recovery request and the uplink channel or signal are for the same MCG, the beam failure recovery request is for an SCell in the MCG, and the uplink channel or signal is for a PCell in the MCG.

2.1.3. Both the beam failure recovery request and the uplink channel or signal are for the same MCG, the beam failure recovery request is for an SCell in the MCG, and the uplink channel or signal is for another SCell in the MCG.

2.2. The beam failure recovery request and the uplink channel or signal are for different cells in the same SCG.

2.2.1. Both the beam failure recovery request and the uplink channel or signal are for the same SCG, the beam failure recovery request is for a PSCell in the SCG, and the uplink channel or signal is for an SCell in the SCG.

2.2.2 Both the beam failure recovery request and the uplink channel or signal are for the same SCG, the beam failure recovery request is for an SCell in the SCG, and the uplink channel or signal is for a PSCell in the SCG.

2.2.3. Both the beam failure recovery request and the uplink channel or signal are for the same SCG, the beam failure recovery request is for an SCell in the SCG, and the uplink channel or signal is for another SCell in the SCG.

3. The beam failure recovery request supposed to be transmitted within the first time period and the uplink channel or signal are for different cell groups.

Specifically, that the beam failure recovery request and the uplink channel or signal are for different cell groups includes the following cases:

3.01. The beam failure recovery request is for a PCell in an MCG, and the uplink channel or signal is for a PSCell in an SCG.

3.02. The beam failure recovery request is for a PCell in an MCG, and the uplink channel or signal is for an SCell in an SCG.

3.03. The beam failure recovery request is for an SCell in an MCG, and the uplink channel or signal is for a PSCell in an SCG.

3.04. The beam failure recovery request is for an SCell in an MCG, and the uplink channel or signal is for an SCell in an SCG.

3.05. The beam failure recovery request is for a PSCell in an SCG, and the uplink channel or signal is for a PCell in an MCG.

3.06. The beam failure recovery request is for a PSCell in an SCG, and the uplink channel or signal is for an SCell in an MCG.

3.07. The beam failure recovery request is for an SCell in an SCG, and the uplink channel or signal is for a PCell in an MCG.

3.08. The beam failure recovery request is for an SCell in an SCG, and the uplink channel or signal is for an SCell in an MCG.

3.09. The beam failure recovery request is for a PCell in an MCG, and the uplink channel or signal is for a PCell in another MCG.

3.10. The beam failure recovery request is for a PCell in an MCG, and the uplink channel or signal is for an SCell in another MCG.

3.11. The beam failure recovery request is for an SCell in an MCG, and the uplink channel or signal is for a PCell in another MCG.

3.12. The beam failure recovery request is for an SCell in an MCG, and the uplink channel or signal is for an SCell in another MCG.

3.13. The beam failure recovery request is for a PSCell in an SCG, and the uplink channel or signal is for a PSCell in another SCG.

3.14. The beam failure recovery request is for a PSCell in an SCG, and the uplink channel or signal is for an SCell in another SCG.

3.15. The beam failure recovery request is for an SCell in an SCG, and the uplink channel or signal is for a PSCell in another SCG.

3.16. The beam failure recovery request is for an SCell in an SCG, and the uplink channel or signal is for an SCell in another SCG.

Optionally, the method of transmitting a beam failure recovery request according to an embodiment may further include:

transmitting, by the UE to the network side device after the first time period, the uplink channel or signal supposed to be transmitted within the at least one second time period.

Optionally, the method of transmitting a beam failure recovery request according to an embodiment may further include:

transmitting, by the UE to the network side device within a third time period and a fourth time period, the uplink channel or signal supposed to be transmitted within the at least one second time period, where the third time period is before the first time period, and the fourth time period is after the first time period.

Further, in the foregoing steps S21 and S22, the first time period for transmitting the beam failure recovery request by the UE and the at least one second time period for transmitting the uplink channel or signal by the UE overlap, and the uplink channel or signal supposed to be transmitted within the at least one second time period carries at least one beam failure recovery request. In this case, a step S24 is performed as follows.

Further, the case in the foregoing embodiments that the first time period for transmitting the beam failure recovery request and the second time period for transmitting the uplink channel or signal overlap and the uplink channel or signal supposed to be transmitted within the at least one second time period carries at least one beam failure recovery request may be found in the following application scenarios.

4. The beam failure recovery request supposed to be transmitted within the first time period and the beam failure recovery request supposed to be transmitted within the at least one second time period are for different cell groups.

Specifically, that the beam failure recovery request supposed to be transmitted within the first time period and the beam failure recovery request supposed to be transmitted within the at least one second time period are for different cell groups includes the following cases:

4.01. The beam failure recovery request supposed to be transmitted within the first time period is for a PCell in an MCG, and the beam failure recovery request supposed to be transmitted within the at least one second time period is for a PSCell in an SCG.

4.02. The beam failure recovery request supposed to be transmitted within the first time period is for a PCell in an MCG, and the beam failure recovery request supposed to be transmitted within the at least one second time period is for an SCell in an SCG.

4.03. The beam failure recovery request supposed to be transmitted within the first time period is for an SCell in an MCG, and the beam failure recovery request supposed to be transmitted within the at least one second time period is for a PSCell in an SCG.

4.04. The beam failure recovery request supposed to be transmitted within the first time period is for an SCell in an MCG, and the beam failure recovery request supposed to be transmitted within the at least one second time period is for an SCell in an SCG.

4.05. The beam failure recovery request supposed to be transmitted within the first time period is for a PSCell in an SCG, and the beam failure recovery request supposed to be transmitted within the at least one second time period is for a PCell in an MCG.

4.06. The beam failure recovery request supposed to be transmitted within the first time period is for a PSCell in an SCG, and the beam failure recovery request supposed to be transmitted within the at least one second time period is for an SCell in an MCG.

4.07. The beam failure recovery request supposed to be transmitted within the first time period is for an SCell in an SCG, and the beam failure recovery request supposed to be transmitted within the at least one second time period is for a PCell in an MCG.

4.08. The beam failure recovery request supposed to be transmitted within the first time period is for an SCell in an SCG, and the beam failure recovery request supposed to be transmitted within the at least one second time period is for an SCell in an MCG.

4.09. The beam failure recovery request supposed to be transmitted within the first time period is for a PCell in an MCG, and the beam failure recovery request supposed to be transmitted within the at least one second time period is for a PCell in another MCG.

4.10. The beam failure recovery request supposed to be transmitted within the first time period is for a PCell in an MCG, and the beam failure recovery request supposed to be transmitted within the at least one second time period is for an SCell in another MCG.

4.11. The beam failure recovery request supposed to be transmitted within the first time period is for an SCell in an MCG, and the beam failure recovery request supposed to be transmitted within the at least one second time period is for a PCell in another MCG.

4.12. The beam failure recovery request supposed to be transmitted within the first time period is for an SCell in an MCG, and the beam failure recovery request supposed to be transmitted within the at least one second time period is for an SCell in another MCG.

4.13. The beam failure recovery request supposed to be transmitted within the first time period is for a PSCell in an SCG, and the beam failure recovery request supposed to be transmitted within the at least one second time period is for a PSCell in another SCG.

4.14. The beam failure recovery request supposed to be transmitted within the first time period is for a PSCell in an SCG, and the beam failure recovery request supposed to be transmitted within the at least one second time period is for an SCell in another SCG.

4.15. The beam failure recovery request supposed to be transmitted within the first time period is for an SCell in an SCG, and the beam failure recovery request supposed to be transmitted within the at least one second time period is for a PSCell in another SCG.

4.16. The beam failure recovery request supposed to be transmitted within the first time period is for an SCell in an SCG, and the beam failure recovery request supposed to be transmitted within the at least one second time period is for an SCell in another SCG.

5. The beam failure recovery request supposed to be transmitted within the first time period and the beam failure recovery request supposed to be transmitted within the at least one second time period are for different cells in the same cell group.

Specifically, that the beam failure recovery request supposed to be transmitted within the first time period and the beam failure recovery request supposed to be transmitted within the at least one second time period are for different cells in the same cell group includes the following cases:

5.1. The beam failure recovery request supposed to be transmitted within the first time period and the beam failure recovery request supposed to be transmitted within the at least one second time period are for different cells in the same MCG.

5.1.1. The beam failure recovery request supposed to be transmitted within the first time period and the beam failure recovery request supposed to be transmitted within the at least one second time period are for the same MCG, the beam failure recovery request supposed to be transmitted within the first time period is for a PCell in the MCG, and the beam failure recovery request supposed to be transmitted within the at least one second time period is for an SCell in the MCG.

5.1.2. The beam failure recovery request supposed to be transmitted within the first time period and the beam failure recovery request supposed to be transmitted within the at least one second time period are for the same MCG, the beam failure recovery request supposed to be transmitted within the first time period is for an SCell in the MCG, and the beam failure recovery request supposed to be transmitted within the at least one second time period is for a PCell in the MCG.

5.1.3. The beam failure recovery request supposed to be transmitted within the first time period and the beam failure recovery request supposed to be transmitted within the at least one second time period are for the same MCG, the beam failure recovery request supposed to be transmitted within the first time period is for an SCell in the MCG, and the beam failure recovery request supposed to be transmitted within the at least one second time period is for another SCell in the MCG.

5.2. The beam failure recovery request supposed to be transmitted within the first time period and the beam failure recovery request supposed to be transmitted within the at least one second time period are for different cells in the same SCG.

5.2.1. The beam failure recovery request supposed to be transmitted within the first time period and the beam failure recovery request supposed to be transmitted within the at least one second time period are for the same SCG, the beam failure recovery request supposed to be transmitted within the first time period is for a PSCell in the SCG, and the beam failure recovery request supposed to be transmitted within the at least one second time period is for an SCell in the SCG.

5.2.2. The beam failure recovery request supposed to be transmitted within the first time period and the beam failure recovery request supposed to be transmitted within the at least one second time period are for the same SCG, the beam failure recovery request supposed to be transmitted within the first time period is for an SCell in the SCG, and the beam failure recovery request supposed to be transmitted within the at least one second time period is for a PSCell in the SCG.

5.2.3. The beam failure recovery request supposed to be transmitted within the first time period and the beam failure recovery request supposed to be transmitted within the at least one second time period are for the same SCG, the beam failure recovery request supposed to be transmitted within the first time period is for an SCell in the SCG, and the beam failure recovery request supposed to be transmitted within the at least one second time period is for another SCell in the SCG.

The step S24 includes: determining whether a total quantity of beam failure recovery requests supposed to be transmitted within the first time period and the second time period is less than or equal to a maximum allowed transmission quantity.

The maximum allowed transmission quantity is the smallest value of a quantity of simultaneously transmitted beam failure recovery requests allowed by a UE capability, a quantity of simultaneously transmitted beam failure recovery requests allowed in a protocol, and a quantity of simultaneously transmitted beam failure recovery requests allowed as per a configuration made by the network side device for the UE.

Assuming that the quantity of simultaneously transmitted beam failure recovery requests allowed by the UE capability is a, the quantity of simultaneously transmitted beam failure recovery requests allowed in the protocol is b, and the quantity of simultaneously transmitted beam failure recovery requests allowed as per a configuration made by the network side device for the UE is c, if a>c and b>c, the maximum allowed transmission quantity is c; if a>b and c>b, the maximum allowed transmission quantity is b; and if b>a and c>a, the maximum allowed transmission quantity is a.

Optionally, the quantity of simultaneously transmitted beam failure recovery requests allowed by the UE capability is the smallest value of: a quantity of simultaneously transmitted beam failure recovery requests supported by a transmit power of the UE, and a quantity of simultaneously transmitted beam failure recovery requests supported by an antenna structure of the UE.

That is, the quantity of simultaneously transmitted beam failure recovery requests allowed by the UE capability is determined by the smaller one of the quantity of simultaneously transmitted beam failure recovery requests supported by the transmit power of the UE and the quantity of simultaneously transmitted beam failure recovery requests supported by the antenna structure of the UE.

Assuming that the quantity of simultaneously transmitted beam failure recovery requests supported by the transmit power of the UE is d, and the quantity of simultaneously transmitted beam failure recovery requests supported by the antenna structure of the UE is f, if d>f, the quantity of simultaneously transmitted beam failure recovery requests allowed by the UE capability is f; and if d<f, the quantity of simultaneously transmitted beam failure recovery requests allowed by the UE capability is d.

In the foregoing step S24, if it is determined that the total quantity of beam failure recovery requests supposed to be transmitted within the first time period and the second time period is less than or equal to the maximum allowed transmission quantity, a step S25 is performed.

The step S25 includes: transmitting one or more beam failure recovery requests supposed to be transmitted within the first time period and the second time period to the network side device within transmission time periods corresponding to the one or more beam failure recovery requests respectively.

That is, when all conditions allow all beam failure recovery requests supposed to be transmitted within the first time period and the second time period to be simultaneously transmitted to the network side device, the beam failure recovery requests supposed to be transmitted within the first time period and the second time period are transmitted to the network side device within transmission time periods corresponding to the beam failure recovery requests respectively. The time periods for transmitting the beam failure recovery requests are not adjusted.

Further, in the foregoing step S24, if it is determined that the total quantity of beam failure recovery requests supposed to be transmitted within the first time period and the second time period is greater than the maximum allowed transmission quantity, a step S26 is performed.

The step S26 includes: transmitting, to the network side device according to any one of solutions 1 to 8, at least one of the beam failure recovery requests supposed to be transmitted within the first time period and the second time period.

Solution 1:

The beam failure recovery requests supposed to be transmitted within the first time period and the second time period are transmitted to the network side device according to a first transmission priority, where a quantity of beam failure recovery requests transmitted at the same moment is less than or equal to the maximum allowed transmission quantity.

For example, when the maximum allowed transmission quantity is 4, the quantity of beam failure recovery requests transmitted at the same moment may be 1 or 2 or 3 or 4. When the maximum allowed transmission quantity is 3, the quantity of beam failure recovery requests transmitted at the same moment may be 1 or 2 or 3.

The first transmission priority includes: a priority level of transmitting a beam failure recovery request for a PCell of an MCG is higher than a priority level of transmitting a beam failure recovery request for an SCell of the MCG, the priority level of transmitting the beam failure recovery request for the SCell of the MCG is higher than a priority level of transmitting a beam failure recovery request for a PSCell of an SCG, and the priority level of transmitting the beam failure recovery request for the PSCell of the SCG is higher than a priority level of transmitting a beam failure recovery request for an SCell of the SCG.

That is, the first transmission priority is: the PCell in the MCG>the SCell in the MCG>the PSCell in the SCG>the SCell in the SCG.

Solution 2:

The beam failure recovery requests supposed to be transmitted within the first time period and the second time period are transmitted to the network side device according to a second transmission priority, where a quantity of beam failure recovery requests transmitted at the same moment is less than or equal to the maximum allowed transmission quantity.

The second transmission priority includes: a priority level of transmitting a beam failure recovery request for a PSCell of an SCG is higher than a priority level of transmitting a beam failure recovery request for an SCell of the SCG, the priority level of transmitting the beam failure recovery request for the SCell of the SCG is higher than a priority level of transmitting a beam failure recovery request for a PCell of an MCG, and the priority level of transmitting the beam failure recovery request for the PCell of the MCG is higher than a priority level of transmitting a beam failure recovery request for an SCell of the MCG.

That is, the second transmission priority is: the PSCell in the SCG>the SCell in the SCG>the PCell in the MCG>the SCell in the MCG.

Solution 3:

The beam failure recovery requests supposed to be transmitted within the first time period and the second time period are transmitted to the network side device according to a third transmission priority, where a quantity of beam failure recovery requests transmitted at the same moment is less than or equal to the maximum allowed transmission quantity.

The third transmission priority includes: a priority level of transmitting a beam failure recovery request for a PCell of an MCG is higher than a priority level of transmitting a beam failure recovery request for a PSCell of an SCG, the priority level of transmitting the beam failure recovery request for the PSCell of the SCG is higher than a priority level of transmitting a beam failure recovery request for an SCell of the MCG, and the priority level of transmitting the beam failure recovery request for the SCell of the MCG is higher than a priority level of transmitting a beam failure recovery request for an SCell of the SCG.

That is, the third transmission priority is: the PCell in the MCG>the PSCell in the SCG>the SCell in the MCG>the SCell in the SCG.

Solution 4:

The beam failure recovery requests supposed to be transmitted within the first time period and the second time period are transmitted to the network side device according to a fourth transmission priority, where a quantity of beam failure recovery requests transmitted at the same moment is less than or equal to the maximum allowed transmission quantity.

The fourth transmission priority includes: a priority level of transmitting a beam failure recovery request for a PSCell of an SCG is higher than a priority level of transmitting a beam failure recovery request for a PCell of an MCG, the priority level of transmitting the beam failure recovery request for the PCell of the MCG is higher than a priority level of transmitting a beam failure recovery request for an SCell of the SCG, and the priority level of transmitting the beam failure recovery request for the SCell of the SCG is higher than a priority level of transmitting a beam failure recovery request for an SCell of the MCG.

That is, the fourth transmission priority is: the PSCell in the SCG>the PCell in the MCG>the SCell in the SCG>the SCell in the MCG.

Solution 5:

The beam failure recovery requests supposed to be transmitted within the first time period and the second time period are transmitted to the network side device according to a fifth transmission priority, where a quantity of beam failure recovery requests transmitted at the same moment is less than or equal to the maximum allowed transmission quantity.

The fifth transmission priority includes: a priority level of transmitting a beam failure recovery request for an SCell of an MCG is higher than a priority level of transmitting a beam failure recovery request for a PCell of the MCG, the priority level of transmitting the beam failure recovery request for the PCell of the MCG is higher than a priority level of transmitting a beam failure recovery request for an SCell of an SCG, and the priority level of transmitting the beam failure recovery request for the SCell of the SCG is higher than a priority level of transmitting a beam failure recovery request for a PSCell of the SCG.

That is, the fifth transmission priority is: the SCell in the MCG>the PCell in the MCG>the SCell in the SCG>the PSCell in the SCG.

Solution 6:

The beam failure recovery requests supposed to be transmitted within the first time period and the second time period are transmitted to the network side device according to a sixth transmission priority, where a quantity of beam failure recovery requests transmitted at the same moment is less than or equal to the maximum allowed transmission quantity.

The sixth transmission priority includes: a priority level of transmitting a beam failure recovery request for an SCell of an SCG is higher than a priority level of transmitting a beam failure recovery request for a PSCell of the SCG, the priority level of transmitting the beam failure recovery request for the PSCell of the SCG is higher than a priority level of transmitting a beam failure recovery request for an SCell of an MCG, and the priority level of transmitting the beam failure recovery request for the SCell of the MCG is higher than a priority level of transmitting a beam failure recovery request for a PCell of the MCG.

That is, the sixth transmission priority is: the SCell in the SCG>the PSCell in the SCG>the SCell in the MCG>the PCell in the MCG.

Solution 7:

The beam failure recovery requests supposed to be transmitted within the first time period and the second time period are transmitted to the network side device according to a seventh transmission priority, where a quantity of beam failure recovery requests transmitted at the same moment is less than or equal to the maximum allowed transmission quantity.

The seventh transmission priority includes: a priority level of transmitting a beam failure recovery request for an SCell of an MCG is higher than a priority level of transmitting a beam failure recovery request for an SCell of an SCG, the priority level of transmitting the beam failure recovery request for the SCell of the SCG is higher than a priority level of transmitting a beam failure recovery request for a PCell of the MCG, and the priority level of transmitting the beam failure recovery request for the PCell of the MCG is higher than a priority level of transmitting a beam failure recovery request for a PSCell of the SCG.

That is, the seventh transmission priority is: the SCell in the MCG>the SCell in the SCG>the PCell in the MCG>the PSCell in the SCG.

Solution 8:

The beam failure recovery requests supposed to be transmitted within the first time period and the second time period are transmitted to the network side device according to an eighth transmission priority, where a quantity of beam failure recovery requests transmitted at the same moment is less than or equal to the maximum allowed transmission quantity.

The eighth transmission priority includes: a priority level of transmitting a beam failure recovery request for an SCell of an SCG is higher than a priority level of transmitting a beam failure recovery request for an SCell of an MCG, the priority level of transmitting the beam failure recovery request for the SCell of the MCG is higher than a priority level of transmitting a beam failure recovery request for a PSCell of the SCG, and the priority level of transmitting the beam failure recovery request for the PSCell of the SCG is higher than a priority level of transmitting a beam failure recovery request for a PCell of the MCG.

That is, the eighth transmission priority is: the SCell in the SCG>the SCell in the MCG>the PSCell in the SCG>the PCell in the MCG.

Optionally, in the foregoing embodiment, the transmitting the beam failure recovery request to the network side device may specifically be: transmitting the beam failure recovery request to the network side device on a PRACH.

In the embodiments of the present application, in a case that it is determined that a first time period for transmitting a beam failure recovery request by UE and at least one second time period for transmitting an uplink channel or signal by the UE overlap and the uplink channel or signal supposed to be transmitted within the at least one second time period does not carry any beam failure recovery request, the UE transmits the beam failure recovery request to a network side device within the first time period. That is, in the embodiments of the present application, a priority level of transmitting a beam failure recovery request is higher than a priority level of transmitting other uplink channel or signal. Therefore, in the embodiments of the present application, the normal transmission of a beam failure recovery request can be ensured when a time period for transmitting a beam failure recovery request conflicts with a time period for transmitting other uplink channel or signal.

Figure 4:
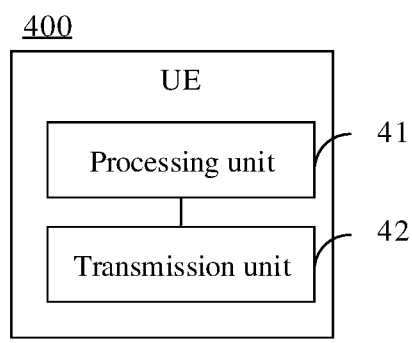
FIG. 4 is a schematic structural diagram of UE according to an embodiment of the present application.

The present application provides in some embodiments UE. Referring to FIG. 4, the UE 400 includes a processing unit 41 and a transmission unit 42.

The processing unit 41 is configured to: in a case that it is determined that a first time period for transmitting a beam failure recovery request by the UE and at least one second time period for transmitting an uplink channel or signal overlap and the uplink channel or signal supposed to be transmitted within the at least one second time period does not carry any beam failure recovery request, control the transmission unit 42 to transmit the beam failure recovery request to a network side device within the first time period.

Optionally, the transmission unit 42 is further configured to transmit, to the network side device after the first time period, the uplink channel or signal supposed to be transmitted within the at least one second time period; or the transmission unit 42 is further configured to transmit, to the network side device within a third time period and a fourth time period, the uplink channel or signal supposed to be transmitted within the at least one second time period, where the third time period is before the first time period, and the fourth time period is after the first time period.

Optionally, the processing unit 41 is further configured to: determine, in a case that it is determined that the first time period for transmitting the beam failure recovery request by the UE and the at least one second time period for transmitting the uplink channel or signal overlap and the uplink channel or signal supposed to be transmitted within the at least one second time period includes at least one beam failure recovery request, whether a total quantity of beam failure recovery requests transmitted within the first time period and the second time period is less than or equal to a maximum allowed transmission quantity, where the maximum allowed transmission quantity is the smallest value of a quantity of simultaneously transmitted beam failure recovery requests allowed by a UE capability, a quantity of simultaneously transmitted beam failure recovery requests allowed in a protocol, and a quantity of simultaneously transmitted beam failure recovery requests allowed as per a configuration made by the network side device for the UE; and if the total quantity of beam failure recovery requests supposed to be transmitted within the first time period and the second time period is less than or equal to the maximum allowed transmission quantity, the transmission unit 42 is further configured to: transmit various beam failure recovery requests supposed to be transmitted within the first time period and the second time period to the network side device within transmission time periods corresponding to the various beam failure recovery requests respectively.

Optionally, the quantity of simultaneously transmitted beam failure recovery requests allowed by the UE capability is the smallest value of: a quantity of simultaneously transmitted beam failure recovery requests supported by a transmit power of the UE and a quantity of simultaneously transmitted beam failure recovery requests supported by an antenna structure of the UE.

Optionally, when the total quantity of beam failure recovery requests supposed to be transmitted within the first time period and the second time period is greater than the maximum allowed transmission quantity, the transmission unit 42 is further configured to: transmit, to the network side device according to a first transmission priority, the beam failure recovery requests supposed to be transmitted within the first time period and the second time period, where a quantity of beam failure recovery requests transmitted at the same moment is less than or equal to the maximum allowed transmission quantity, and the first transmission priority includes: a priority level of transmitting a beam failure recovery request for a PCell of an MCG is higher than a priority level of transmitting a beam failure recovery request for an SCell of the MCG, the priority level of transmitting the beam failure recovery request for the SCell of the MCG is higher than a priority level of transmitting a beam failure recovery request for a PSCell of an SCG, and the priority level of transmitting the beam failure recovery request for the PSCell of the SCG is higher than a priority level of transmitting a beam failure recovery request for an SCell of the SCG.

Optionally, when the total quantity of beam failure recovery requests supposed to be transmitted within the first time period and the second time period is greater than the maximum allowed transmission quantity, the transmission unit 42 is further configured to: transmit, to the network side device according to a second transmission priority, the beam failure recovery requests supposed to be transmitted within the first time period and the second time period, where a quantity of beam failure recovery requests transmitted at the same moment is less than or equal to the maximum allowed transmission quantity, and the second transmission priority includes: a priority level of transmitting a beam failure recovery request for a PSCell of an SCG is higher than a priority level of transmitting a beam failure recovery request for an SCell of the SCG, the priority level of transmitting the beam failure recovery request for the SCell of the SCG is higher than a priority level of transmitting a beam failure recovery request for a PCell of an MCG, and the priority level of transmitting the beam failure recovery request for the PCell of the MCG is higher than a priority level of transmitting a beam failure recovery request for an SCell of the MCG.

Optionally, when the total quantity of beam failure recovery requests supposed to be transmitted within the first time period and the second time period is greater than the maximum allowed transmission quantity, the transmission unit 42 is further configured to: transmit, to the network side device according to a third transmission priority, the beam failure recovery requests supposed to be transmitted within the first time period and the second time period, where a quantity of beam failure recovery requests transmitted at the same moment is less than or equal to the maximum allowed transmission quantity, and the third transmission priority includes: a priority level of transmitting a beam failure recovery request for a PCell of an MCG is higher than a priority level of transmitting a beam failure recovery request for a PSCell of an SCG, the priority level of transmitting the beam failure recovery request for the PSCell of the SCG is higher than a priority level of transmitting a beam failure recovery request for an SCell of the MCG, and the priority level of transmitting the beam failure recovery request for the SCell of the MCG is higher than a priority level of transmitting a beam failure recovery request for an SCell of the SCG.

Optionally, when the total quantity of beam failure recovery requests supposed to be transmitted within the first time period and the second time period is greater than the maximum allowed transmission quantity, the transmission unit 42 is further configured to: transmit, to the network side device according to a fourth transmission priority, the beam failure recovery requests supposed to be transmitted within the first time period and the second time period, where a quantity of beam failure recovery requests transmitted at the same moment is less than or equal to the maximum allowed transmission quantity, and the fourth transmission priority includes: a priority level of transmitting a beam failure recovery request for a PSCell of an SCG is higher than a priority level of transmitting a beam failure recovery request for a PCell of an MCG, the priority level of transmitting the beam failure recovery request for the PCell of the MCG is higher than a priority level of transmitting a beam failure recovery request for an SCell of the SCG, and the priority level of transmitting the beam failure recovery request for the SCell of the SCG is higher than a priority level of transmitting a beam failure recovery request for an SCell of the MCG.

Optionally, the transmission unit 42 is specifically configured to transmit the beam failure recovery request to the network side device on a PRACH.

The UE provided in this embodiment can implement any process shown in FIG. 2 in the method embodiment. To avoid repetition, details are not described herein again.

According to the UE provided in the embodiments of the present application, in a case that it is determined that a first time period for transmitting a beam failure recovery request by the UE and at least one second time period for transmitting an uplink channel or signal overlap and the uplink channel or signal supposed to be transmitted within the at least one second time period does not carry any beam failure recovery request, the UE transmits the beam failure recovery request to a network side device within the first time period. That is, in the embodiments of the present application, a priority level of transmitting a beam failure recovery request is higher than a priority level of transmitting other uplink channel or signal. Therefore, in the embodiments of the present application, the normal transmission of a beam failure recovery request can be ensured when a time period for transmitting a beam failure recovery request conflicts with a time period for transmitting other uplink channel or signal.

Figure 5:
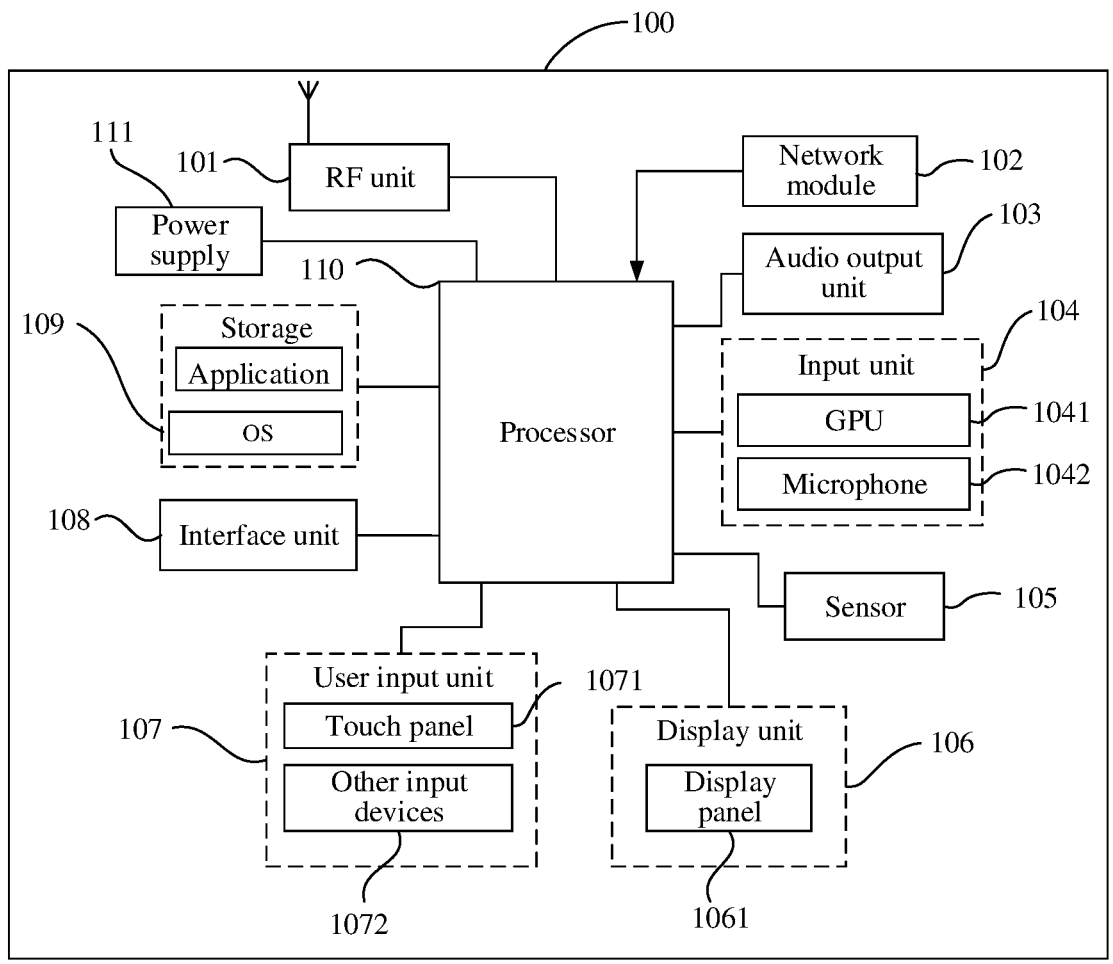
FIG. 5 is a schematic diagram of a hardware structure of UE according to an embodiment of the present application.

FIG. 5 is a schematic diagram of a hardware structure of UE according to an embodiment of the present application. UE 100 includes, but is not limited to, a radio frequency (RF) unit 101, a network module 102, an audio output unit 103, an input unit 104, a sensor 105, a display unit 106, a user input unit 107, an interface unit 108, a storage 109, a processor 110, and a power supply 111, among other components. It may be understood by those skilled in the art that the UE structure shown in FIG. 5 does not constitute a limitation on the UE, and the UE may include more or fewer components than those shown, or some components may be combined, or different component arrangements are used. In this embodiment of the present application, the UE includes, but is not limited to, a mobile phone, a tablet computer, a notebook computer, a palmtop computer, an in-vehicle terminal, a wearable device, a pedometer and the like.

The processor 110 is configured to detect whether each of all PDCCH beams fails. The all PDCCH beams are PDCCH beams configured by a base station for the UE to monitor.

The RF unit 101 is configured to: transmit a first beam failure recovery request to the base station when the processor 110 determines that a quantity of failed PDCCH beams is within a preset range, where the preset range is from 0 to the quantity of all the PDCCH beams; and transmit a second beam failure recovery request to the base station when the processor 110 determines that all the PDCCH beams fail, where the second beam failure recovery request is different from the first beam failure recovery request.

Because the UE transmits the first beam failure recovery request to the base station when the quantity of failed PDCCH beams is within the preset range and the first beam failure recovery request is different from the second beam failure recovery request transmitted when all the PDCCH beams fail, the base station may know, according to the first beam failure recovery request, that the quantity of failed PDCCH beams is within the preset range, or know, according to the second beam failure recovery request, that all PDCCH beams fail, to further perform beam failure recovery in time.

It should be understood that, in this embodiment of the present application, the RF unit 101 may be configured to receive and transmit signals during receiving or transmitting information or during a call. Specifically, the RF unit 101 receives downlink data from the base station and provides the data to the processor 110 for processing. In addition, the RF unit 101 transmits uplink data to the base station. Generally, the RF unit 101 includes, but is not limited to, an antenna, at least one amplifier, a transceiver, a coupler, a low noise amplifier, a duplexer, and the like. In addition, the RF 101 can also communicate with a network and other devices through a wireless communication system.

The UE provides a user with wireless broadband Internet access through the network module 102, for example, helps the user to receive and send emails, browse web pages, access streaming media and the like.

The audio output unit 103 may convert audio data received by the RF unit 101 or the network module 102 or stored in the storage 109 into an audio signal and output the audio signal as sound. Moreover, the audio output unit 103 can also provide audio output associated with a specific function performed by the UE 100 (for example, incoming call ringtone, message received ringtone and the like). The audio output unit 103 includes a speaker, a buzzer, a receiver, and the like.

The input unit 104 is configured to receive an audio or video signal. The input unit 104 may include a graphics processing unit (GPU) 1041 and a microphone 1042, and the GPU 1041 processes image data of a still picture or video obtained by an image capturing device (such as a camera) in a video capturing mode or an image capturing mode. Processed image frames can be displayed on the display unit 106. The image frames processed by the GPU 1041 may be stored in the storage 109 (or other storage medium) or transmitted via the RF unit 101 or the network module 102. The microphone 1042 can receive sound and can process such sound into audio data. In a telephone call mode, the processed audio data can be converted into a format that can be transmitted to a mobile communication base station via the RF unit 101 for output.

The UE 100 further includes at least one sensor 105 such as a light sensor, motion sensor, and other sensors. Specifically, the light sensor includes an ambient light sensor and a proximity sensor. The ambient light sensor can adjust the brightness of the display panel 1061 according to the intensity of the ambient light, and the proximity sensor can turn off the display panel 1061 and/or backlight when the UE 100 is moved near the ear. As a kind of motion sensor, an accelerometer sensor can detect the magnitude of acceleration in a plurality of directions (usually three axes). When the accelerometer sensor is stationary, the accelerometer sensor can detect the magnitude and direction of gravity. The accelerometer sensor can be used in posture identification of the UE (for example, switching between a landscape mode and a portrait mode, related games, magnetometer posture calibration), vibration recognition related functions (such as pedometer, tapping), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061. The display panel 1061 may be configured in the form of a liquid-crystal display (LCD), an organic light-emitting diode (OLED) or the like.

The user input unit 107 may be configured to receive input numeric or character information and to generate key signal inputs related to user settings and functional control of the UE. Specifically, the user input unit 107 includes a touch panel 1071 and other input devices 1072. The touch panel 1071, also referred to as a touch screen, can collect a touch operation (for example, an operation of the user on the touch panel 1071 or near the touch panel 1071 using a finger, a stylus or any appropriate object or accessory) of the user on or near the touch panel 1071. The touch panel 1071 may include two parts, namely, a touch detection device and a touch controller. The touch detection device detects the position touched by the user, detects a signal brought by the touch operation, and transmits the signal to the touch controller. The touch controller receives touch information from the touch detection device, converts the touch information into contact coordinates, and sends the contact coordinates to the processor 110. The touch controller receives commands from the processor 110 and executes the commands In addition, the touch panel 1071 may be implemented in various types such as resistive, capacitive, infrared, and surface acoustic wave. In addition to the touch panel 15071, the user input unit 107 may further include other input devices 1072. Specifically, other input devices 1072 may include, but are not limited to, a physical keyboard, functional keys (for example, a volume control button, and a switch button), a trackball, a mouse, and a joystick. Details are not described herein.

Further, the touch panel 1071 may be overlaid on the display panel 1061. When the touch panel 1071 detects a touch operation on or near the touch panel 1071, the touch panel 1071 transmits the touch operation to the processor 110 to determine the type of a touch event. The processor 110 then provides a corresponding visual output on the display panel 1061 according to the type of the touch event. Although in FIG. 5, the touch panel 1071 and the display panel 1061 are used as two independent components to implement the input and output functions of the UE, in some embodiments, the touch panel 1071 and the display panel 1061 may be integrated to implement the input and output functions of the UE, which is not limited herein.

The interface unit 108 is an interface by which an external device is connected to the UE 100. For example, the external device may include a wired or wireless headset port, an external power (or battery charger) port, a wired or wireless data port, a memory card port, a port for connecting a device having an identification module, an audio input/output (I/O) port, a video I/O port, a headphone port, and the like. The interface unit 108 may be configured to receive input (for example, data information, and power) from the external device and transmit the received input to one or more components within the UE 100 or may be configured to transfer data between the UE 100 and the external device.

The storage 109 may be configured to store software programs as well as various data. The storage 109 may mainly include a program storage area and a data storage area. The program storage area may store an operating system (OS), an application required for at least one function (for example, a sound playback function, and an image displaying function), and the like. The data storage area may store data (for example, audio data, and a phone book) created according to the use of a mobile phone. Moreover, the storage 109 may include a high-speed random access memory (RAM), and may further include a non-volatile storage, for example, at least one magnetic disk storage device, flash memory device, or other volatile solid state storage device.

The processor 110 is a control center of the UE and is connected to various portions of the entire UE using various interfaces and lines, and performs various functions of the UE and processes data by running or executing software programs and/or modules stored in the storage 109 and invoking data stored in the storage 109, so as to monitor the UE as a whole. The processor 110 may include one or more processing units. Optionally, the processor 110 may integrate an application processor and a modem. The application processor mainly processes an operating system, a user interface, an application, and the like. The modem mainly processes wireless communication. It may be understood that the modem may also not be integrated into the processor 110.

The UE 100 may further include a power supply 111 (for example, a battery) for powering various components. Optionally, the power supply 111 may be logically coupled to the processor 110 through a power management system, so as to implement charging management, discharging management, power consumption management, and other functions through the power management system.

In addition, the UE 100 includes some functional modules not shown. Details are not described herein again.

Figure 6:
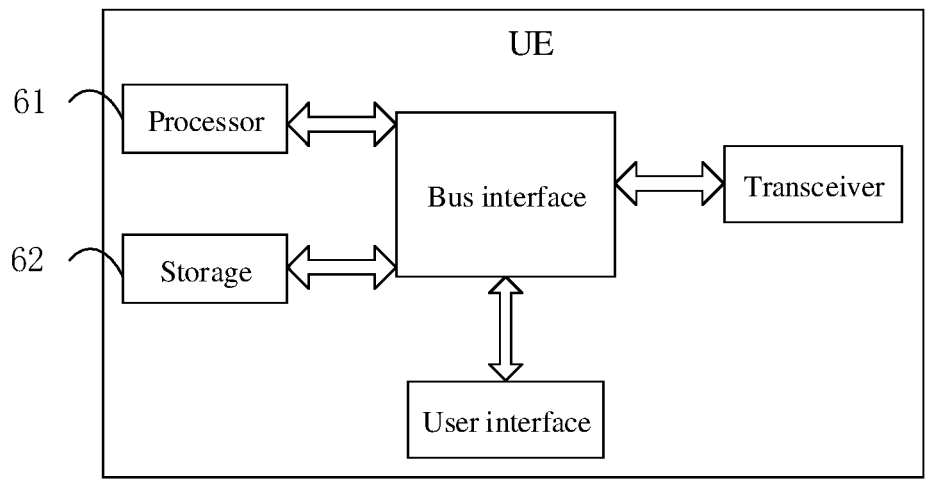
FIG. 6 is another schematic diagram of a hardware structure of UE according to an embodiment of the present application.

The present application further provides in some embodiments UE. Referring to FIG. 6, the UE includes a processor 61, a storage 62, and a computer program stored in the storage 62 and executable on the processor 61. The computer program is configured to be executed by the processor 61 to implement the processes in the method of transmitting a beam failure recovery request in Embodiment 1, and can achieve the same technical effects. To avoid repetition, details are not described herein again.

The present application further provides in some embodiments a computer-readable storage medium, where the computer-readable storage medium stores therein a computer program, and the computer program is configured to be executed by a processor to implement various processes of the method of transmitting a beam failure recovery request in the foregoing embodiments, and can achieve the same technical effects. To avoid repetition, details are not described herein again. The computer-readable storage medium is, for example, a read-only memory (ROM), a RAM, a magnetic disk, an optical disc or the like.

The present application further provides in some embodiments a computer-readable storage medium, where the computer-readable storage medium stores therein a computer program, and the computer program is configured to be executed by a processor to implement various processes in the embodiments of the method of transmitting a beam failure recovery request, and can achieve the same technical effects. To avoid repetition, details are not described herein again. The computer-readable storage medium is, for example, a ROM, a RAM, a magnetic disk, an optical disc or the like.

It should be noted that the terms "include", "including", or any variation thereof herein are intended to cover a non-exclusive inclusion. Therefore, a process, method, object or apparatus including a series of elements not only includes such elements, but also includes other elements not specified expressly, or may include elements inherent to the process, method, object or apparatus. In the case that there is no more limitation, an element preceded by the expression "include a/an . . . " does not preclude the existence of additional identical elements in the process, method, object or apparatus including the element.

Based on the description of the implementations, persons skilled in the art may clearly understand that the methods in the embodiments may be implemented by using software plus a necessary generic hardware platform, and certainly may be implemented by hardware. In many cases, the former is preferred. Based on such an understanding, essential part, or part contributing to the related art, of the technical solutions of the present application may be implemented in the form of a software product. The computer software product may be stored in a storage medium (for example, a ROM/RAM, a magnetic disk, an optical disc), and includes several instructions for instructing a terminal (which may be a mobile phone, a computer, a server, an air conditioner, a network side device or the like) to perform the methods according to the embodiments of the present application.

The embodiments of the present application are described above with reference to the accompanying drawings. However, the present application is not limited to the foregoing specific implementations. The foregoing specific implementations are merely illustrative rather than limitative. In light of the teachings of the present application, a person of ordinary skill in the art may further make various forms without departing from the spirit of the present application and the scope of the claims, and these forms all fall within the scope of the present application.

What is claimed is:

1. A method of transmitting a beam failure recovery request, applied to user equipment (UE), comprising:
    transmitting, in a case that a first time period for transmitting a beam failure recovery request overlaps with at least one second time period for transmitting an uplink channel or signal and the uplink channel or signal supposed to be transmitted within the at least one second time period does not carry any beam failure recovery request, the beam failure recovery request to a network side device within the first time period;
    in a case that the first time period for transmitting the beam failure recovery request is determined to overlap the at least one second time period for transmitting the uplink channel or signal and the uplink channel or signal supposed to be transmitted within the at least one second time period carries at least one beam failure recovery request,
    when a total quantity of beam failure recovery requests supposed to be transmitted within the first time period and the second time period is less than a maximum allowed transmission quantity, transmitting the beam failure recovery requests supposed to be transmitted within the first time period and the second time period to the network side device within the respective first and second transmission time periods corresponding to the beam failure recovery requests.

2. The method according to claim 1, further comprising: transmitting, to the network side device after the first time period, the uplink channel or signal supposed to be transmitted within the at least one second time period.

3. The method according to claim 1, wherein
    the maximum allowed transmission quantity is a smallest value of a quantity of simultaneously transmitted beam failure recovery requests allowed by a UE capability, a quantity of simultaneously transmitted beam failure recovery requests allowed in a protocol, and a quantity of simultaneously transmitted beam failure recovery requests allowed as per a configuration made by the network side device.

4. The method according to claim 3, wherein the quantity of simultaneously transmitted beam failure recovery requests allowed by the UE capability is a smallest value of a quantity of simultaneously transmitted beam failure recovery requests supported by a transmit power of the UE and a quantity of simultaneously transmitted beam failure recovery requests supported by an antenna structure of the UE.

5. The method according to claim 1, further comprising:
    when the total quantity of beam failure recovery requests supposed to be transmitted within the first time period and the second time period is greater than the maximum allowed transmission quantity, transmitting, to the network side device according to a first transmission priority order; the beam failure recovery requests supposed to be transmitted within the first time period and the second time period, wherein a quantity of beam failure recovery requests transmitted at the same moment is less than or equal to the maximum allowed transmission quantity, and
    the first transmission priority order comprises: a priority level of transmitting a beam failure recovery request for a primary cell (PCell) of a master cell group (MCG) is higher than a priority level of transmitting a beam failure recovery request for a secondary cell (SCell) of the MCG, the priority level of transmitting the beam failure recovery request for the SCell of the MCG is higher than a priority level of transmitting a beam failure recovery request for a primary secondary cell (PSCell) of a secondary cell group (SCG), and the priority level of transmitting the beam failure recovery request for the PSCell of the SCG is higher than a priority level of transmitting a beam failure recovery request for an SCell of the SCG.

6. The method according to claim 1, further comprising:
    when the total quantity of beam failure recovery requests supposed to be transmitted within the first time period and the second time period is greater than the maximum allowed transmission quantity, transmitting, to the network side device according to a second transmission priority order, the beam failure recovery requests supposed to be transmitted within the first time period and the second time period, wherein a quantity of beam failure recovery requests transmitted at the same moment is less than or equal to the maximum allowed transmission quantity, and
    the second transmission priority order comprises: a priority level of transmitting a beam failure recovery request for a primary secondary cell (PSCell) of a secondary cell group (SCG) is higher than a priority level of transmitting a beam failure recovery request for a secondary cell (SCell) of the SCG, the priority level of transmitting the beam failure recovery request for the SCell of the SCG is higher than a priority level of transmitting a beam failure recovery request for a primary cell (PCell) of a master cell group (MCG), and the priority level of transmitting the beam failure recovery request for the PCell of the MCG is higher than a priority level of transmitting a beam failure recovery request for an SCell of the MCG.

7. The method according to claim 1, further comprising:
    when the total quantity of beam failure recovery requests supposed to be transmitted within the first time period and the second time period is greater than the maximum allowed transmission quantity, transmitting, to the network side device according to a third transmission priority order, the beam failure recovery requests supposed to be transmitted within the first time period and the second time period, wherein a quantity of beam failure recovery requests transmitted at the same moment is less than or equal to the maximum allowed transmission quantity, and the third transmission priority order comprises: a priority level of transmitting a beam failure recovery request for a primary cell (PCell) of a master cell group (MCG) is higher than a priority level of transmitting a beam failure recovery request for a primary secondary cell (PSCell) of a secondary cell group (SCG), the priority level of transmitting the beam failure recovery request for the PSCell of the SCG is higher than a priority level of transmitting a beam failure recovery request for a secondary cell (SCell) of the MCG, and the priority level of transmitting the beam failure recovery request for the SCell of the MCG is higher than a priority level of transmitting a beam failure recovery request for an SCell of the SCG.

8. The method according to claim 1, further comprising: when the total quantity of beam failure recovery requests supposed to be transmitted within the first time period and the second time period is greater than the maximum allowed transmission quantity, transmitting, to the network side device according to a fourth transmission priority order, the beam failure recovery requests supposed to be transmitted within the first time period and the second time period, wherein a quantity of beam failure recovery requests transmitted at the same moment is less than or equal to the maximum allowed transmission quantity, and the fourth transmission priority order comprises: a priority level of transmitting a beam failure recovery request for a primary secondary cell (PSCell) of a secondary cell group (SCG) is higher than a priority level of transmitting a beam failure recovery request for a primary cell (PCell) of a master cell group (MCG), the priority level of transmitting the beam failure recovery request for the PCell of the MCG is higher than a priority level of transmitting a beam failure recovery request for a secondary cell (SCell) of the SCG, and the priority level of transmitting the beam failure recovery request for the SCell of the SCG is higher than a priority level of transmitting a beam failure recovery request for an SCell of the MCG.

9. The method according to claim 1, wherein the transmitting the beam failure recovery request to the network side device comprises:
transmitting the beam failure recovery request to the network side device on a physical random access channel (PRACH).

10. User equipment (UE), comprising a processor, a storage, and a computer program stored in the storage and configured to be executed by the processor, wherein the processor is configured to execute the computer program to implement following step:
transmitting, in a case that a first time period for transmitting a beam failure recovery request overlaps with at least one second time period for transmitting an uplink channel or signal and the uplink channel or signal supposed to be transmitted within the at least one second time period does not carry any beam failure recovery request, the beam failure recovery request to a network side device within the first time period;
in a case that the first time period for transmitting the beam failure recovery requests is determined to overlap the at least one second time period for transmitting the uplink channel or signal and the uplink channel or signal supposed to be transmitted within the at least one second time period carries at least one beam failure recovery request, when a total quantity of beam failure recovery requests supposed to be transmitted within the first time period and the second time period is less than or equal to a maximum allowed transmission quantity, transmitting the beam failure recovery requests supposed to be transmitted within the first time period and the second time period to the network side device within the respective first and second transmission time periods corresponding to the beam failure recovery requests.

11. The UE according to claim 10, wherein the processor is configured to execute the computer program to implement following steps:
transmitting, to the network side device after the first time period, the uplink channel or signal supposed to be transmitted within the at least one second time period.

12. The UE according to claim 10, wherein the maximum allowed transmission quantity is a smallest value of a quantity of simultaneously transmitted beam failure recovery requests allowed by a LIE capability, a quantity of simultaneously transmitted beam failure recovery requests allowed in a protocol, and a quantity of simultaneously transmitted beam failure recovery requests allowed as per a configuration made by the network side device.

13. The UE according to claim 12, wherein the quantity of simultaneously transmitted beam failure recovery requests allowed by the UE capability is a smallest value of a quantity of simultaneously transmitted beam failure recovery requests supported by a transmit power of the UE and a quantity of simultaneously transmitted beam failure recovery requests supported by an antenna structure of the UE.

14. The UE according to claim 10, wherein the processor is configured to execute the computer program to implement following steps:
when the total quantity of beam failure recovery requests supposed to be transmitted within the first time period and the second time period is greater than the maximum allowed transmission quantity, transmitting, to the network side device according to a first transmission priority order, the beam failure recovery requests supposed to be transmitted within the first time period and the second time period, wherein a quantity of beam failure recovery requests transmitted at the same moment is less than or equal to the maximum allowed transmission quantity, and
the first transmission priority order comprises: a priority level of transmitting a beam failure recovery request for a primary cell (PCell) of a master cell group (MCG) is higher than a priority level of transmitting a beam failure recovery request for a secondary cell (SCell) of the MCG, the priority level of transmitting the beam failure recovery request for the SCell of the MCG is higher than a priority level of transmitting a beam failure recovery request for a primary secondary cell (PSCell) of a secondary cell group (SCG), and the priority level of transmitting the beam failure recovery request for the PSCell of the SCG is higher than a priority level of transmitting a beam failure recovery request for an SCell of the SCG;
or,
when the total quantity of beam failure recovery requests supposed to be transmitted within the first time period and the second time period is greater than the maximum allowed transmission quantity, transmitting, to the network side device according to a second transmission priority order, the beam failure recovery requests supposed to be transmitted within the first time period and the second time period, wherein a quantity of beam failure recovery requests transmitted at the same moment is less than or equal to the maximum allowed transmission quantity, and the second transmission priority order comprises: a priority level of transmitting a beam failure recovery request for a primary secondary cell (PSCell) of a secondary cell group (SCG) is higher than a priority level of transmitting a beam failure recovery request for a secondary cell (Scell) of the SCG, the priority level of transmitting the beam failure recovery request for the Scell of the SCG is higher than a priority level of transmitting a beam failure recovery request for a primary cell (PCell) of a master cell group (MCG), and the priority level of transmitting the beam failure recovery request for the PCell of the MCG is higher than a priority level of transmitting a beam failure recovery request for an SCell of the MCG;

or, when the total quantity of beam failure recovery requests supposed to be transmitted within the first time period and the second time period is greater than the maximum allowed transmission quantity, transmitting, to the network side device according to a third transmission priority order, the beam failure recovery requests supposed to be transmitted within the first time period and the second time period, wherein a quantity of beam failure recovery requests transmitted at the same moment is less than or equal to the maximum allowed transmission quantity, and the third transmission priority order comprises: a priority level of transmitting a beam failure recovery request for a primary cell (PCell) of a master cell group (MCG) is higher than a priority level of transmitting a beam failure recovery request for a primary secondary cell (PSCell) of a secondary cell group (SCG), the priority level of transmitting the beam failure recovery request for the PSCell of the SCG is higher than a priority level of transmitting a beam failure recovery request for a secondary cell (SCell) of the MCG, and the priority level of transmitting the beam failure recovery request for the SCell of the MCG is higher than a priority level of transmitting a beam failure recovery request for an SCell of the SCG;

or, when the total quantity of beam failure recovery requests supposed to be transmitted within the first time period and the second time period is greater than the maximum allowed transmission quantity, transmitting, to the network side device according to a fourth transmission priority order, the beam failure recovery requests supposed to be transmitted within the first time period and the second time period, wherein a quantity of beam failure recovery requests transmitted at the same moment is less than or equal to the maximum allowed transmission quantity, and the fourth transmission priority order comprises: a priority level of transmitting a beam failure recovery request for a primary secondary cell (PSCell) of a secondary cell group (SCG) is higher than a priority level of transmitting a beam failure recovery request for a primary cell (PCell) of a master cell group (MCG), the priority level of transmitting the beam failure recovery request for the PCell of the MCG is higher than a priority level of transmitting a beam failure recovery request for a secondary cell (SCell) of the SCG, and the priority level of transmitting the beam failure recovery request for the SCell of the SCG is higher than a priority level of transmitting a beam failure recovery request for an SCell of the MCG.

15. The UE according to claim 10, wherein the transmitting the beam failure recovery request to the network side device comprises:

transmitting the beam failure recovery request to the network side device on a physical random access channel (PRACH).

16. A non-transitory computer-readable storage medium storing therein a computer program, wherein the computer program is configured to be executed by a processor to implement the steps in the method of transmitting a beam failure recovery request according to claim 1.

* * * * *